C. D. SCHMIDT.
ANTISKID DEVICE FOR VEHICLE WHEELS.
APPLICATION FILED NOV. 24, 1917.
1,273,933.
Patented July 30, 1918.
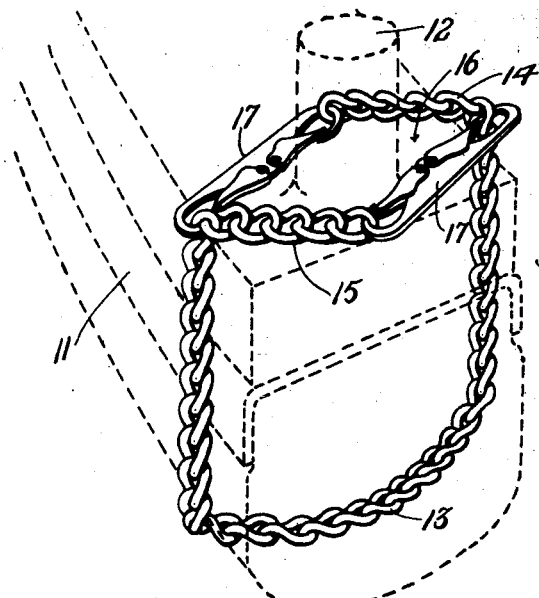
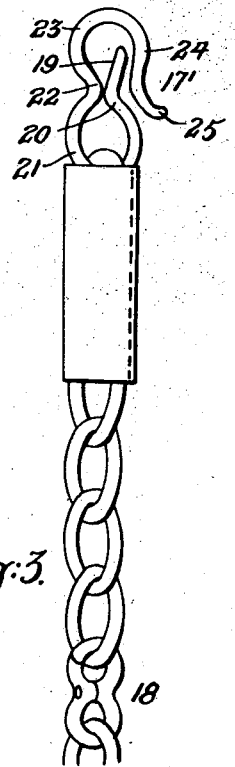
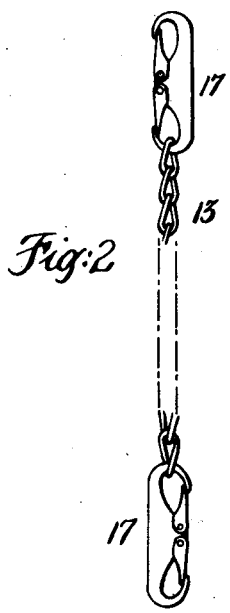
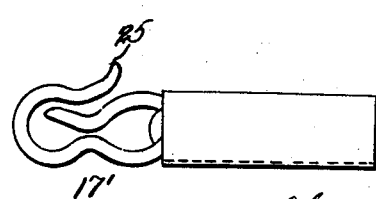
INVENTOR
Charles D. Schmidt
BY Edwards, Sager & Richmond
ATTORNEYS

UNITED STATES PATENT OFFICE.

CHARLES D. SCHMIDT, OF WOODHAVEN, NEW YORK.

ANTISKID DEVICE FOR VEHICLE-WHEELS.

1,273,933.

Specification of Letters Patent.

Patented July 30, 1918.

Application filed November 24, 1917. Serial No. 203,650.

*To all whom it may concern:*

Be it known that I, CHARLES D. SCHMIDT, a citizen of the United States, residing at Woodhaven, Long Island, in the county of Queens and State of New York, have invented certain new and useful Improvements in Antiskid Devices for Vehicle-Wheels, of which the following is a specification.

The principal object of my invention is to provide a new and improved device to be applied to motor truck wheels to give improved traction and prevent skidding. Another object of my invention is to provide a device of this nature that can be conveniently applied to the vehicle wheel or removed as desired. Other objects of my invention have to do with making such a device so that if it becomes broken, the parts will not be lost, so that no special modification nor permanent attachment upon the wheel shall be necessary, and that can be conveniently and cheaply manufactured and repaired. All these objects and others will be made apparent in connection with the following disclosure of a limited number of specific embodiments of my invention. It will be understood that modifications can be made within the scope of the invention.

Referring to the drawings, Figure 1 is a perspective view of my improved anti-skidding device as applied to a vehicle wheel.

Fig. 2 is a view of the anti-skidding device apart from the wheel, the intermediate portion of the device being broken away.

Fig. 3 is a similar view of a modification, and

Fig. 4 is a perspective view of a repair link that may be employed in this connection.

A length of suitable chain 13 as shown in Fig. 2 has two double snaps 17 connected therewith, one at each end. This chain 13 is then passed one and a fraction times around the wheel rim 11 so that the intermediate portion lies across the wheel tread, one end portion 14 lies beside the spoke 12 and the other end portion 15 lies on the other side of the same spoke 12. Each snap hook 17 is engaged into an intermediate link of the chain as shown in Fig. 1 so that the chain as a whole encircles the rim 11 and also comprises a smaller loop 16 surrounding the spoke 12. This loop 16 consists of the two end portions 14 and 15 joined by the two hooks 17.

In Fig. 3 a somewhat different form is shown, in which two repair links 18 are introduced, equally spaced from the ends of the chain, so that when the portion of the chain between them wears out, it can be replaced without discarding the end portions of the chain. Also in the modification shown in Fig. 3, I employ a different form of end hook made of a single piece of metal stock bent in the form shown. This may be said to consist of two eyes 21 and 23. The inner end 19 of the piece of which this hook is formed is within the open eye 23 and at the points 20 and 22, the parts approach very closely together, somewhat closer than the thickness of the stock of which the chain is made. The part 24 at the end of the open eye is uniformly spaced from the end 19 and the part 20, the distance being about equal to the thickness of the stock of which the chain is made, except that the extreme end portion 25 may be bent a little wider away from the part 20.

It will be seen that in making up this device in readiness to be applied to a vehicle wheel, a piece of chain 13 of the proper length is taken and the end hooks 17 or 17', as the case may be, are easily engaged therewith. No special work on the chain itself is necessary, unless the intermediate repair links 18 are employed. These will be referred to later.

When it is desired to apply one of these devices to a wheel, the intermediate part of the chain 13 is placed transversely across the wheel tread at a point opposite a spoke, and the chain is wrapped as far as it will go around the wheel rim, the ends 14 and 15 lapping past each other with the spoke between them. Then the end hooks 17 are engaged into the intermediate links of the chain adjacent thereto and as a result the chain not only encircles the wheel rim but it comprises a minor loop 16 around the spoke.

One advantage of this combination is that the device can be applied to practically any wheel without any special preparation of the wheel to receive it. With many devices of the prior art, it has been necessary to affix special eyelets or other fastening means on the wheel rim so that the anti-skidding devices could be fastened thereto. No such special equipment on the wheel is necessary with my device.

It is well known that anti-skid chains are subject to considerable wear and eventually the tread chains become worn through and break. If the chain should merely go around the wheel rim without a special loop around the spoke, then upon its breaking as just described, it would be lost. My device cannot be lost by the breaking of a single link either on the tread portion or at any other point. My device comprises two loops and while the breaking of a link may open one of them, the integrity of the other loop will be sufficient to retain it on the wheel. The breaking of one of the end hooks will not result in the loss of the chain because it will still leave the loop around the wheel rim unbroken.

My anti skid device is very easily applied and removed—only two simple manual operations are necessary, namely, the engagement of the two hooks 17 into the appropriate links of the chain.

In case it becomes desirable to replace the chains, the hooks are readily detachable therefrom and can be used in connection with new chains.

Referring to Fig. 3, the narrow opening in the link 17' at 20—22 makes it necessary to apply some force to engage the closed eye 21 of the hook with the end link of the chain. This can readily be done because once the hook is applied to the chain, it will remain there during the useful service of the device. The space between the portions 20 and 24 is barely wide enough to permit engagement of the open eye 23 with a link. The end 19 projecting into this open eye 23 prevents the hook from accidentally becoming disengaged.

It will be noticed that the portion of the chain shown in Fig. 3 that goes across the wheel tread lies between the two repair links 18, so that when this part wears out, it can easily be replaced and it will not be necessary to renew the whole chain. While I have suggested the use of chain as the essential material for my improved tire grip, it will be evident that any suitable equivalent therefor may be employed.

I claim:—

1. In combination, a wheel rim, a spoke, a length of chain and two hooks at the respective ends of the chain, the chain being wrapped one and a fraction times around the rim with its intermediate part lying across the wheel tread and with its end portions lapping past each other and with the spoke between them, and each hook engaging an adjacent intermediate link of the chain.

2. In combination, a wheel rim, a spoke, a length of chain wrapped around said rim with an intermediate part thereof lying across the wheel tread and its end portions lapping past each other on the side of the rim opposite the tread with the spoke between them, and fastening elements detachably engaging the respective ends of the chain with adjacent intermediate points thereof.

3. In combination, a wheel rim, a spoke, a tire chain and two hooks attached to said chain and hooked into certain links thereof, said chain comprising one loop extending around said rim and another loop around said spoke, each loop being adapted to maintain its integrity if the other loop breaks, and the complete removal of the chain from the wheel being effected by the disengagement of both said hooks from said links of the chain into which they are hooked.

CHARLES D. SCHMIDT.